United States Patent
Williams

(10) Patent No.: US 7,984,003 B2
(45) Date of Patent: Jul. 19, 2011

(54) METHOD AND SYSTEM FOR AUTOMATED LEARNING THROUGH REPETITION

(76) Inventor: Nathaniel Williams, Homewood, IL (US)

( * ) Notice: Subject to any disclaimer, the term of this patent is extended or adjusted under 35 U.S.C. 154(b) by 676 days.

(21) Appl. No.: 11/879,555

(22) Filed: Jul. 18, 2007

(65) Prior Publication Data

US 2008/0021852 A1 Jan. 24, 2008

Related U.S. Application Data

(60) Provisional application No. 60/832,476, filed on Jul. 21, 2006.

(51) Int. Cl.
*G06F 17/00* (2006.01)
(52) U.S. Cl. ........................................................ 706/45
(58) Field of Classification Search .................... 706/45, 706/62; 434/322, 327, 335
See application file for complete search history.

(56) References Cited

U.S. PATENT DOCUMENTS

| | | | |
|---|---|---|---|
| 4,366,551 A | 12/1982 | Holtz | |
| 4,380,185 A | 4/1983 | Halcomb | |
| 4,769,846 A | 9/1988 | Simmons | |
| 5,351,653 A | 10/1994 | Marischen | |
| 5,429,513 A | 7/1995 | Diaz-Plaza | |
| 5,730,603 A | 3/1998 | Harless | |
| 6,022,221 A * | 2/2000 | Boon | 434/156 |
| 6,148,328 A | 11/2000 | Cuomo | |
| 6,299,452 B1 * | 10/2001 | Wasowicz et al. | 434/178 |
| 6,348,856 B1 | 2/2002 | Jones | |
| 6,397,186 B1 | 5/2002 | Bush | |
| 6,402,520 B1 | 6/2002 | Freer | |
| 6,409,513 B1 | 6/2002 | Kawamura | |
| 6,411,932 B1 | 6/2002 | Molnar | |
| 6,468,084 B1 | 10/2002 | MacMillan | |
| 6,493,649 B1 | 12/2002 | Jones | |
| 6,556,783 B1 | 4/2003 | Gelphman | |
| 6,626,676 B2 | 9/2003 | Freer | |
| 6,710,719 B1 | 3/2004 | Jones | |
| 6,729,882 B2 | 5/2004 | Noble | |
| 7,010,477 B1 | 3/2006 | Iwahashi | |
| 7,080,014 B2 | 7/2006 | Bush | |
| 2001/0029322 A1 | 10/2001 | Iliff | |
| 2001/0048027 A1 | 12/2001 | Walsh | |
| 2002/0116266 A1 | 8/2002 | Marshall | |
| 2002/0172971 A1 | 11/2002 | Yoshida | |
| 2002/0195488 A1 | 12/2002 | Walsh | |
| 2003/0024375 A1 | 2/2003 | Sitrick | |
| 2003/0100965 A1 | 5/2003 | Sitrick | |
| 2003/0110925 A1 | 6/2003 | Sitrick | |
| 2003/0110926 A1 | 6/2003 | Sitrick | |
| 2003/0135095 A1 | 7/2003 | Iliff | |
| 2003/0163299 A1 | 8/2003 | Iliff | |
| 2003/0216228 A1 | 11/2003 | Rast | |
| 2004/0016799 A1 | 1/2004 | Walsh | |
| 2004/0077934 A1 | 4/2004 | Massad | |
| 2004/0249778 A1 | 12/2004 | Iliff | |
| 2005/0026131 A1 * | 2/2005 | Elzinga et al. | 434/365 |
| 2005/0097179 A1 | 5/2005 | Orme | |
| 2005/0154616 A1 | 7/2005 | Iliff | |

(Continued)

*Primary Examiner* — David R Vincent
(74) *Attorney, Agent, or Firm* — Lesavich High-Tech Law Group, P.C.; Stephen Lesavich

(57) ABSTRACT

A method and system for automated learning through repetition. The method and system may improve automated learning of information studied for religious, academic purposes or pleasure by presenting pre-determined patterns selected specifically based on a belief system for a learner for an optimal learning for of N-pieces of electronic information (e.g., audio tracks, etc.).

20 Claims, 2 Drawing Sheets

U.S. PATENT DOCUMENTS

| | | |
|---|---|---|
| 2005/0165285 A1 | 7/2005 | Iliff |
| 2005/0214731 A1* | 9/2005 | Smith .......................... 434/322 |
| 2005/0277099 A1* | 12/2005 | Van Schaack et al. ........ 434/322 |
| 2006/0017579 A1 | 1/2006 | Albert |
| 2006/0220826 A1 | 10/2006 | Rast |
| 2006/0250260 A1 | 11/2006 | Albert |
| 2006/0288842 A1 | 12/2006 | Sitrick |
| 2008/0001735 A1 | 1/2008 | Tran |

* cited by examiner

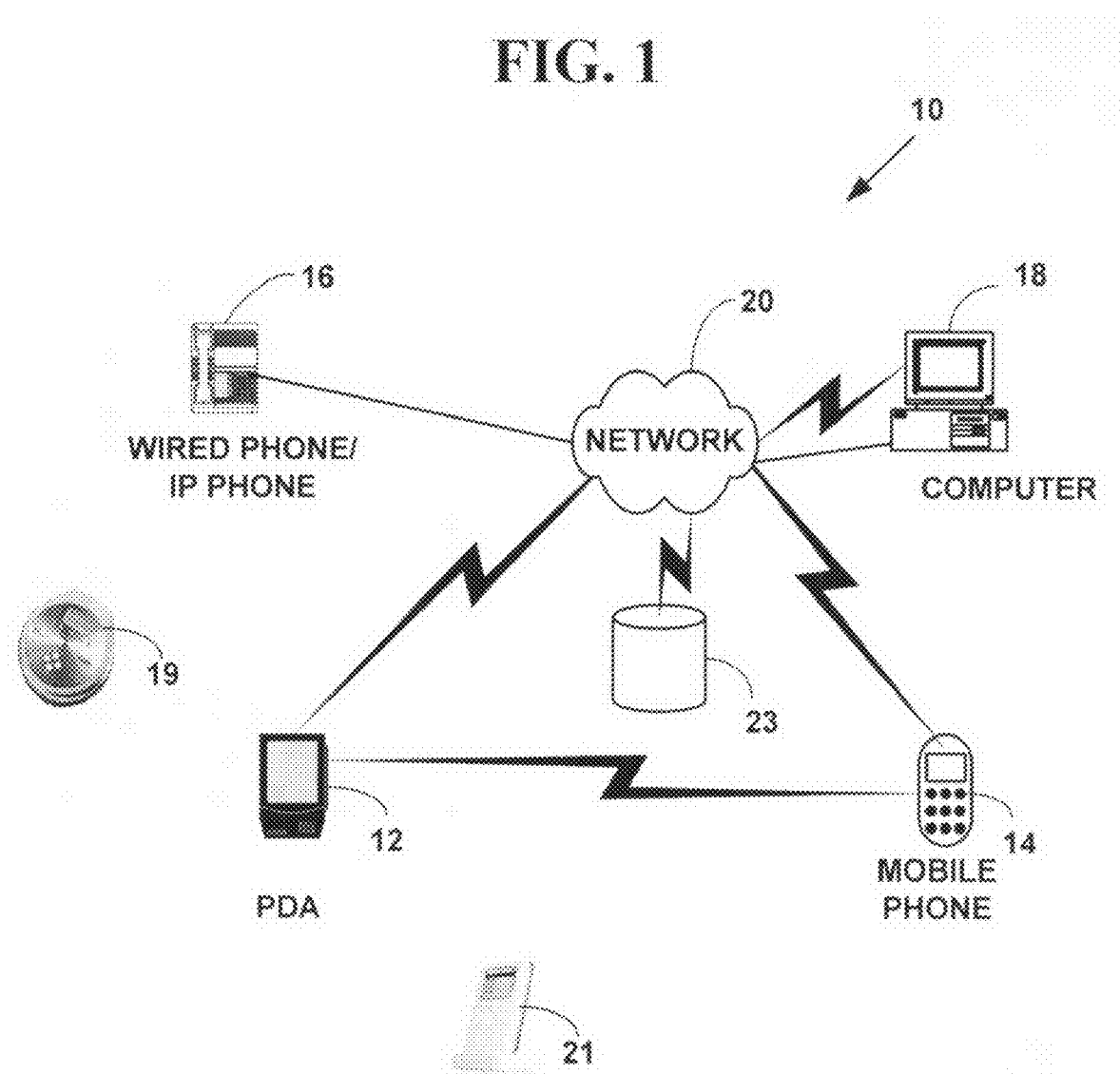

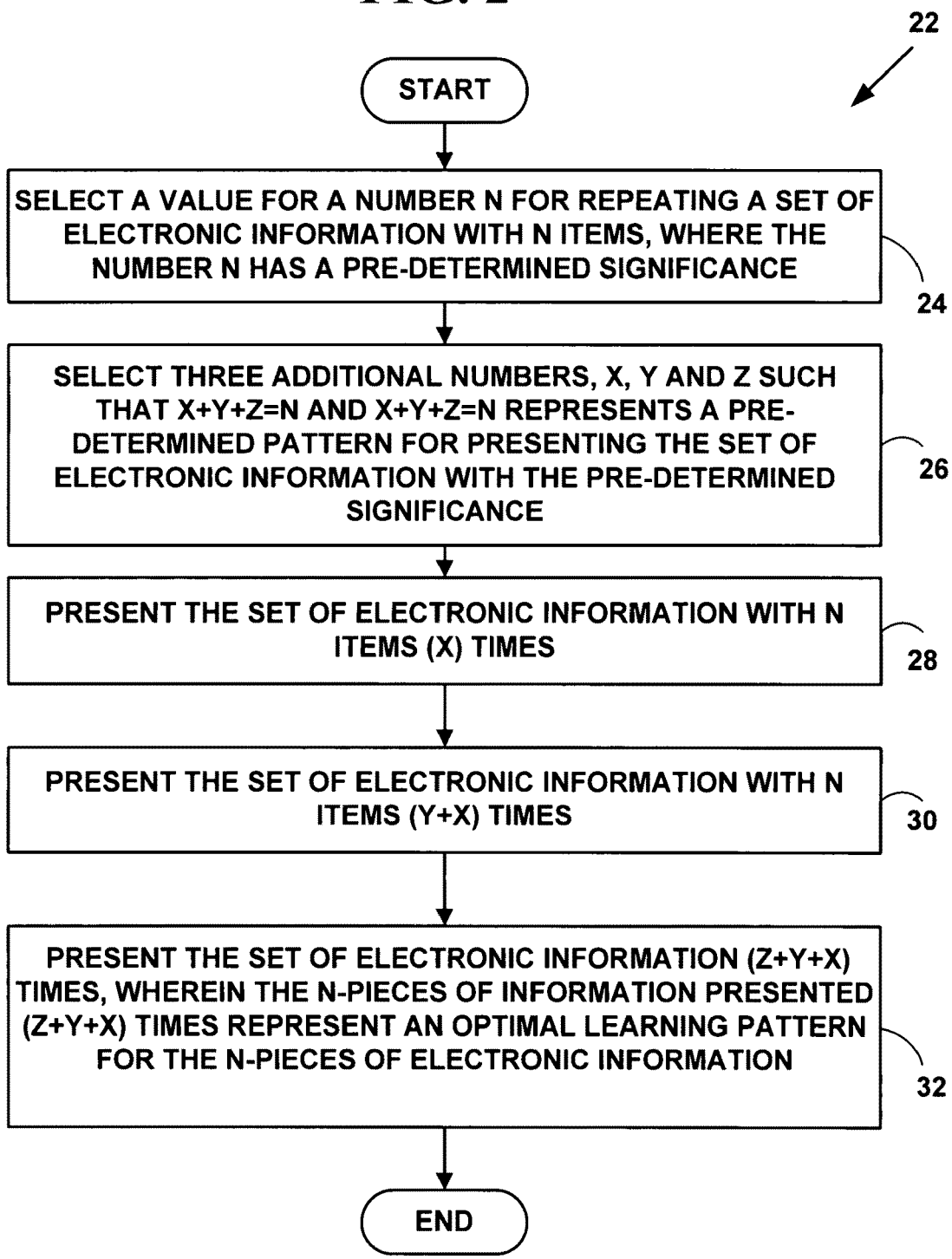

METHOD AND SYSTEM FOR AUTOMATED LEARNING THROUGH REPETITION

CROSS REFERENCES TO RELATED APPLICATION

This applications claims priority to U.S. Provisional Application No. 60/832,476, filed Jul. 21, 2006, the contents of which are incorporated by reference.

FIELD OF THE INVENTION

This invention relates to automated learning systems. More specifically, it relates to a method and system for automated learning through repetition.

BACKGROUND OF THE INVENTION

Mathematics is the study of numbers and their properties. Math was developed in part through the use of abstraction and logical reasoning, from counting, calculation, measurement, and the study of the shapes and motions of physical objects.

Numerology is also the study of numbers, and the manner in which they reflect certain aptitudes and character tendencies in humans. Numbers or sequences of numbers also have certain vibrations whether they are spoken or written. Each letter for a word that spells out a number in letters provides a related vibration when spoken. Sequences of numbers provide an interrelation of vibrations. Experts in numerology use numbers to determine the best time for major moves and activities in life. Numerology is used to decide when to invest, when to marry, when to travel, when to change jobs, or relocate.

Learning is the process of acquiring knowledge or skill through study, experience or teaching. It is a process that depends on experience and leads to short-term and long-term changes in behavior potential. Learning is also a change in neural function as a consequence of experience.

The scientific conclusion that that repetition improves learning is a very old concept. In a book published in 1885 by Hermann Ebbinghaus, one the first researcher to carry out a prolonged series of experiments on human memory showed experimentally that retention of information improves as a function of the number of times the information has been studied. Since the time of Ebbinghaus, countless investigators have used repetition to study learning and memory.

Simple repetition can have a powerful impact on learning. Rote learning is learning by repetition, based on the idea that one will understand the meaning of the material the more they repeat it. Spaced repetition is a learning technique in which increasing intervals of time are used for subsequent reviews.

Repetition for learning using a pre-determined number of repetitions is also frequently used. However, the number of repetitions is used for learning are not selected based on a desired input or desired output or the beliefs of human who has a desire to learn something.

There have been many attempts to study how a human or animal brain reacts to repetitive learning techniques. For example, Russell A. Poldrack and John D. E. Gabrieli in a paper entitled "Characterizing the neural mechanisms of skill learning and repetition priming," Brain, Vol. 124, No. 1, pp. 67-82, January 2001, teach "The changes in brain activity related to skill learning and repetition priming in a mirror-reading task were examined using functional MRI. Subjects exhibited significant learning across five training sessions and this learning generalized significantly to different spatial transformations (inverted-mirror reversed text and normal letters spelled backwards). Mirror reading, compared with reading normal text, was associated with extensive activation in occipital, temporal, parietal and frontal regions. Learning to read mirror-reversed (MR) text was associated with increased activation in left inferior temporal, striatal, left inferior prefrontal and right cerebellar regions and with decreased activity in the left hippocampus and left cerebellum. Short-term repetition priming was associated with reduced activity in many of the regions active during mirror reading and extensive item-specific practice (long-term repetition priming) resulted in a virtual elimination of activity in those regions. Short- and long-term repetition priming thus appeared to rely upon common neural mechanisms. Nearly all of the regions exhibiting significant learning-related changes also exhibited increased repetition priming effects, suggesting common neural substrates for priming and skill learning in this task. Comparison of MR items with other spatially transformed typographies showed that the learning-related changes were general to all of the spatial transformations. The results confirm the importance of striatofrontal neural networks for the acquisition of skills, and suggest that skill learning and repetition priming may have common substrates within a particular task."

Georg Grön, David Schul, Volker Bretschneider, A. P. Wunderlich, Matthias W. Riepe in an article entitled "Alike performance during nonverbal episodic learning from diversely imprinted neural networks," European Journal of Neuroscience 18 (11), pp. 3112-3120 (2003) teach "Performance on neuropsychological testing permits inferences to be made regarding neural networks required to solve the task. In healthy young human subjects it is common sense that differential performance in cognitive tasks results from recruitment of different neural networks and that alike performance results from recruitment of alike neural networks. It was the goal of the present study to investigate whether these assumptions are also valid in cross-cultural studies. To address this, we used functional MRI during a nonverbal episodic memory task with repeated learning. Behavioural performance in this task was alike over repeated trials in native Chinese and Caucasian subjects. Given this equivalent performance, the distinct pattern of neuronal activation observed is interpreted as the outcome of different culturally imprinted processing routines. In the 'what' and 'where' framework of visuo-spatial processing initial learning in Chinese subjects activated the dorsal stream for analysis of spatial features whereas Caucasians recruited the ventral stream for object identification. With repeated learning Chinese subjects integrated visuo-spatial processing to object coding and vice versa. Thus, imprints of culture result in activation of distinct neural networks and mandate monitoring of both behavioural performance and neural recruitment in cross-cultural studies of cognition."

Matthew Walker and Jeffrey Ellenbogen.Many in an article entitled "Take a Walk on the Blind Side," Focus Online, May 18, 2007, Harvard Medical School, teach we have assumed that the ability to see patterns in the welter of human experience is the product of conscious attention and thought. However we have found is that such inferential knowledge may be hatched outside the glare of consciousness, during a period of nonconscious, or offline, processing after a period of repetitive learning. Fifty-six students were asked to perform a simple inference task. Subjects who were tested shortly after an initial learning period performed, as a group, no better than chance. Groups of subjects tested after a period of at least 12 hours had a much higher success rate—nearly 80 percent of their inferences were correct. And those tested after a night's sleep were able to draw more distant connections."

William L. Mikulas, Ph.D. professor of psychology at the University of West Florida, teaches at the Universal Resource Locator (URL) "uwf.edu/psych/faculty/mikulas.html" on the Internet teaches "many theorists have been concerned with applying principles of learning to the understanding of repetitive verbal learning and retention. Of the theories dealing with retention, the most popular for quite a while was the associative interference theory. According to this theory, retention loss is due to competition from alternative responses at the time of recall. Thus, when a person can't remember another person's name, although he once knew it, it is probably not because the name is lost from the memory storage. Rather, it is because other responses, such as other names, interfere with the retrieval of the desired name from the memory. Distinctions are often made between short-term memory (STM) and long-term memory (LTM). The basic distinction is how long the information is stored, although there is no consensus on the time something can be stored and still be considered STM.

Many theorists identify other differences between STM and LTM. Some have suggested that information in STM decays over time, while forgetting in LTM is basically a function of interference due to similarity of material. Another distinction is that STM has a limited storage capacity (how much information it can hold at one time) while LTM, for practical purposes, is not limited."

However, none of these studies have solved all of the problems associated with repetitive learning. Therefore it is desirable to provide a method and system for automated learning through repetition.

SUMMARY OF THE INVENTION

In accordance with preferred embodiments of the present invention, some of the problems associated with automated learning are overcome. A method and system for system for automated learning through repetition is presented.

The method and system may improve automated learning of information studied for religious, academic purposes or pleasure. The method and system may improve automated learning of information studied for religious, academic purposes or pleasure by presenting pre-determined patterns selected specifically based on a belief system for a user for an optimal learning for of N-pieces of electronic information (e.g., audio tracks, etc.).

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 1 is a block diagram illustrating an exemplary automated learning system; and FIG. 2 is a block diagram illustrating a method for retention through repetition.

DETAILED DESCRIPTION OF THE INVENTION

FIG. 1 is a block diagram illustrating an exemplary automated learning system 10. The exemplary system 10 includes plural network devices 12, 14, 16, 18 (four of which are illustrated). The plural network devices 12, 14, 16, 18 include, but are not limited to, multimedia capable desktop and laptop computers, facsimile machines, mobile phones, non-mobile phones, Internet phones, Internet appliances, personal digital/data assistants (PDA), two-way pagers and other types of network devices with speakers to play audio output. The plural network devices 12, 14, 16, 18 include one or more of a wired interface and/or a wireless interface used to connect to a communications network 20 to provide voice, video and data communications.

The plural network devices also include plural stand-alone non-networked devices such as CD-ROM players 19, digital audio file players 21, such as MP3 players and types of handheld electronic devices with speakers.

The system 10 further includes a communications network 20. The communications network 20 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 20 providing voice, video and data communications.

The communications network 20 may include one or more gateways, routers, or bridges. As is known in the art, a gateway connects communication networks using different communication or networking protocols and/or operating at different network transmission capacities. A router receives transmitted messages and forwards them to their correct destinations over the most efficient available route. A bridge is a device that connects networks using the same communications protocols so that information can be passed from one network device to another.

The communications network 20 may also include one or more servers or access points (AP) including wired and wireless access points (WiAP) (not illustrated).

The communications network 20 includes data networks using the Transmission Control Protocol (TCP), User Datagram Protocol (UDP), Internet Protocol (IP) and other data protocols.

In one embodiment, the one or more servers include one or more Voice over Internet Protocol (VoIp) VoIP servers. The VoIP servers are used for IP phones or VoIP phones or other IP based devices. In another embodiment, the one or more servers include one or more IP servers or other data communications servers.

The communications network 20 may also include portions of a PSTN or cable television network that connect the network devices 12, 14, 16, 18 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

The system further includes one or more databases 23. The one or more databases 23 include plural audio, video, electronic text and other types of electronic information accessible via the communications network 20.

Preferred embodiments of the present invention includes network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, the ADSL Forum, or the Voice over Internet Protocol Forum. However, network devices and interfaces based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com." Voice over Internet Protocol documents can be found at the URL "www.voip-info.org."

An operating environment for network devices and interfaces of the present invention include a processing system with one or more high speed Central Processing Unit(s) (CPU) or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM)) mass storage system readable by the CPU. The computer readable medium includes cooperating or interconnected computer readable medium, which exist exclusively on the processing system or be distributed among multiple interconnected processing systems that may be local or remote to the processing system.

In one embodiment of the present invention, the wireless interfaces used for the plural network devices 12, 14, 16, 18 include but are not limited to, an IEEE 802.11a, 802.11b, 802.11g, 802.11n, "Wireless Fidelity" (Wi-Fi), "Worldwide Interoperability for Microwave Access" (WiMAX), ETSI High Performance Radio Metropolitan Area Network (HIPERMAN), "RF Home" or other wireless interfaces.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54 M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

During an audio/video conferencing call or a voice call on network devices 12, 14, 16, 18 audio information is typically supplied by audio equipment (e.g., a handset, microphone/speaker, speaker-phone, etc.) that implements voice transmission functions and typically include at least one voice codec that sends and receives packetized voice to capture audio information.

For example, the audio codecs used in network devices 12, 14, 16, 18 are compliant ITU-T G.711, G.722, G.723, G.728 and G.729 standards, the contents of which are incorporated herein by reference. Global System for Mobile Communications (GSM) codecs can also be used. As is known in the art, GSM is a digital cellular telephone technology widely used throughout Europe, in Australia, India, Africa, Asia, and the Middle East, and growing in use in the United States. The ITU-T GSM codec standards are incorporated herein by reference. However, other audio codecs could also be used and the present invention is not limited to such audio codecs.

During audio/video conference calling, video information is typically supplied by video equipment (e.g., video cameras, etc.) In one embodiment of the present invention, Motion Pictures Expert Group (MPEG-2) or Video Coding Experts Group (VCEG) codecs are used.

As is known in the art, MPEG is a set of standards for audio and video compression established by the Joint ISO/IEC Technical Committee on Information Technology. The original MPEG standard for storing and retrieving video and audio information, was designed for CD-ROM technology.

As is known in the art, MPEG-1 defines data cell encoding for a medium bandwidth of up to 1.5 Mbps, two audio channels, and non-interlaced video. MPEG-2 is an extension of the MPEG-1 standard designed for broadcast television, including HDTV. MPEG-2 defines a higher bandwidth of up to 40 Mbps, five audio channels, a wider range of frame sizes, and interlaced video.

As is known in the art, MPEG-2 in general is defined in the ISO/IEC Standard JTC1/SC29/WG11, entitled "Coding of Moving Pictures and Audio," incorporated herein by reference. MPEG-2 is also defined by the ITU-T H.222.0, standard entitled "Generic coding of moving pictures and associated audio information," the contents of which is incorporated herein by reference. However, other audio/video and video codecs could also be used and the present invention is not limited to the MPEG codecs described.

As is known in the art, MPEG3 or MP3 is the name of a file extension and also the name of the type of file for MPEG, audio layer 3. Layer 3 is one of three coding schemes (layer 1, layer 2 and layer 3) for the compression of audio signals. Layer 3 uses perceptual audio coding and psychoacoustic compression to remove all superfluous information (more specifically, the redundant and irrelevant parts of a sound signal. The stuff the human ear doesn't hear anyway). It also adds a MDCT (Modified Discrete Cosine Transform) that implements a filter bank, increasing the frequency resolution 18 times higher than that of layer 2.

As is known in the art, VCEG defines a data cell encoding for third generation (3G) mobile networks. The ITU-T Q.6/SG156 standard is incorporated herein by reference.

Retention Through Repetition (RTR)

Sensory memory of a human brain retains an exact copy of what is seen or heard (i.e., visual and audio information). Items stored inShort Term Memory (STM) are routinely associated with sounds, but may be associated with and stored as images.

STM is vulnerable to interruption or interference and characterized by a limited capacity to store up to about seven (7) pieces of independent information and an ability to hold such information only for a brief duration. Long Term Memory (LTM) is a permanent storage of information where information is stored on the basis of meaning and importance.

The number of items that can typically be stored in STM was first identified by psychologly researcher George Miller in 1956. Miller's study found that the amount of information which can be remembered and recalled from STM for one exposure to the information is between five and nine items, depending on the information. Applying a statistical range of plus or minus two, the number seven (7) became known as "Miller's Magic Number," the number of items which can be held in Short-Term Memory at any one time.

The process of transferring information from STM to LTM involves the encoding or consolidation of the information. This transfer is a function of organizing complex information via repetition in STM before it is encoded into LTM. "Schemas" are mental models used to define information in the human brain. Information in LTM is stored in interrelated networks of schemas. Schemas form intricate knowledge structures in the human brain for recalling information.

In this process of schema organization, the meaning for a learner or emotional content of an item plays an important role in its retention into LTM. The present invention provides a method and system to repeat electronic information to make it relevant and meaningful enough for a learner to make the important transfer of information from short-term memory to long-term memory.

FIG. 2 is a block diagram illustrating a Method 22 for retention through repetition. At Step 24, a value for a number N is selected for repeating a set of electronic information N times. The value for the number N has a pre-determined significance. At Step 26, three additional numbers, X, Y and Z are selected such that $X+Y+Z=N$ and represents a pre-determined pattern for presenting the set of electronic information with the pre-determined significance. At Step 28, the set of electronic information with N items is presented (X) times. At Step 30, the set of electronic information with N items is presented (Y+X) times. At Step 32, the set of electronic information is presented (Z+Y+X) times. The N-pieces of information presented (Z+Y+X) times represent an optimal learning for the N-pieces of electronic information.

Method 22 is illustrated with an exemplary embodiment. However, the present invention is not limited to this embodiment and other embodiments can also be used to practice the invention.

In such an exemplary embodiment at Step 24, a value for the number N (e.g., 7) is selected for repeating set of electronic information. All numbers have mathematical characteristics and also have certain symbolic, religious, vibrational, mathematical, psychological and other significances. The value for the number N is selected based on one or more of these significances.

For example, the number three (3) is a trinity number (e.g., Father, Son, Holy Spirit) for Christians and is also recognized as a "strong" number in Jewish numerology. The number seven (7) represents a perfect number of the Hebrew Scriptures, means "fullness" and is considered God's complete number by Christians. The number seven is also considered a lucky number by many.

It has been said that the Hebrews referred to the number nine (9) as the symbol of immutable Truth. The Ennead, or nine pointed star, is an ancient and sacred symbol. It comprises three trinities. The Egyptian, Celtic, Greek and Christian myths all have an ennead of nine gods and goddesses, representing the entire archetypal range of principles. The "magic square" of nine tiles is also considered sacred and full of power in Islamic, Tibetan, Buddhist, Celtic, Indian and Jewish traditions. A magic square is when each number is used only once, but the horizontal, vertical and diagonal sums are all equal. Many Chinese architects have patterned their architectural temples along the harmonious principles of the magic square and the number nine.

In the Spiritual traditions, a life path of number nine suggests that a person entered into the earth plane with an abundance of dramatic feelings coupled with a strong sense of compassion and generosity. The key to the nature of a life path number nine person is found in their humanitarian attitude. Even the very average of those with life path of a number nine possess extremely compassionate tendencies.

Mathematically the number nine is also is a composite number, its proper divisors being one and three. The number nine is a third square number. Nine is a Motzkin number. It is a first composite number. The number nine is the second non-unitary square prime (i.e., $3^2$). It has a unique aliquot (sum σ(n) 4) which is itself a square prime (i.e., $2^2$). Nine is the only square prime with an aliquot sum of the same form. The aliquot sequence of nine has a set of five members (9,4,3,1,0) this number being the $2^{nd}$ composite member of the 3-aliquot tree.

The numbers illustrated herein are exemplary number only. The present invention is not limited to the number nine and other numbers can be used to practice the invention. Other numbers with other symbolic, lucky, religious, vibrational, mathematical, psychological and other significances can also be used to practice the invention.

The value of N is selected by a learner based on his/her own religious belief system, if any, or symbolic, luck, mathematical, psychological, or belief system.

By allowing a learner to determine his/her own value of N, the desired outcome for learning the electronic information is dramatically improved since the learner has some emotional attachment or belief to the value of the number N. The value of the number N also has a scientific and/or psychological value that aids repetitive learning, retention and recall.

For example, a Christian user may select the number seven (7) and the electronic information may include plural audio tracks each comprising a scripture verse from the Bible played some multiples of seven times. A Buddhist user may select another number such as the number eight (8) which represents infinity and the integration of the human form into the spiritual form and the electronic information may include plural audio tracks each comprising meditation chants, etc.

Both of these numbers are within the range of George Miller's classic number seven from psychology for learning and retaining information in STM.

However, virtually any value for N (positive or negative or zero value) from any belief system or symbolic system can be used to practice the invention. The current invention is not limited to religious-based numbers or the specific exemplary numbers described herein.

The electronic information includes, but is not limited to, audio information, video information, electronic textual information, etc. The electronic information may be dynamically obtained from database 23 via communications network 20 network devices 12, 14, 16, 18 or be stored in non-volatile storage (e.g., Read Only Memory (ROM), flash, hard drive, CD, etc.) on network devices 12, 14, 16, 18 or stand alone devices 19, etc. However, the present invention is not limited to such information and other types of electronic information can be used to practice the invention.

At Step 26, three additional numbers, X, Y and Z are selected such that $X+Y+Z=N$ and $X+Y+Z=N$ represents a pre-determined pattern for presenting the set of electronic information with the pre-determined significance.

For example, if the number seven (7) is selected, then one possible selection is for $X=1, Y=2$ and $Z=4$. If the number nine is selected than one possible selection is for $X=Y=Z=3$ or $X=6, Y=2$ and $Z=1$, etc. These examples illustrate positive numbers. However, negative numbers can also be used as long as the sum $(X+Y+Z)$ is equal to N.

The selection of X, Y and Z is also significant psychological point of view as certain repetitive number sequences are known to provide optimal learning and recall from a short term and long term memory of learner.

In addition, the learner may select a sequence of numbers the sum of which is equal to N based on their religious or other belief system. This also helps provide optimal learning and recall for a learner due to the emotional attachment of the learner to the numbers selected the sum of which is equal to N.

For example, a Christian learner may select $X=1, Y=5$ and $Z=3$ wherein the value of N was selected as the number (9). The number nine is a "super-strong" number as it is "3×3" or a triple trilogy of the Father, Son and Holy Spirit. The number 153 is also indicated as the number of fish caught by the Apostles after the Resurrection of Christ and is noted in John's Gospel in the New Testament of Bible (i.e., John 21:11). When the individual digits, $1+5+3$ are added up, they also total up to nine. The number 153 can also be factored as $3\times3\times17$. The number seventeen (17) has been used to identify Abraham, Isaac and Jacob from the Old Testament. For example, God's covenant with Abraham appears in (Genesis 17:1-8), and Isaac and Jacob are mentioned in (Hebrews 11:17), (Acts 17:11), etc. The corresponding electronic information may then include Bible verses from (John 21) or from other topics related to Jesus and fish or fisherman or other unrelated topics from the Bible.

There are many similar examples for other religions and belief systems that could be selected by a user. A learner can select the value of N and $X+Y+Z=N$ to be virtually any number with virtually any significance to the user. For example, a learner may select the number fifteen (15) and $X=1, Y=5$ and $Z=9$ since the learner has three children ages 1, 5 and 9 and these add up the value of 15.

At Step 28, the set of electronic information with N items is presented (X) times. The (X) times present the electronic information to a learner for the first time, based on some sub-component of the value number N. The value of (X) is selected to first present the electronic information to a learner for storage in STM.

At Step 30, the set of electronic information with N items is presented (Y+X) times. In one embodiment, resenting the electronic information (Y+X) times helps bring the information into greater focus based on the combination of the numbers (Y+X) and its corresponding repetitive pattern in STM and to develop a schema for transfer to LTM.

At Step 32, the set of electronic information is presented (Z+Y+X) times. The N-pieces of information presented (Z+Y+X) times represent an optimal learning pattern for the N-pieces of electronic information based on its corresponding repetitive pattern and the emotional attachment of the number for the learner. This optimal pattern also aids transfer of the information from STM to LTM for the user. In one embodiment, the optimal learning pattern and transfer from STM and LTM is determined by changes in a human brain with scientific experiments (e.g., Magnetic Resonance Imaging (MRI), etc.) on the human brain. For example, taking before, during and after MRI's of a human brain while a learner to exposed to Method 22 using various values for N, X, Y, and Z.

In one embodiment the optimal learning pattern is based a learner's belief system and associated emotions. In another embodiment, the optimal learning pattern includes both the learner's belief system and/or psychological principals. However, the present invention is not limited to any of these embodiments and other embodiments can also be used to practice the invention.

At Step 32, presenting the electronic information (Z+Y+X) times allows the electronic information to be stored and recalled from both STM and LTM memory of learner who is listening to or viewing the electronic information.

Method 22 can also be used a form of meditative practice or for other religious or non-religious purposes. In one embodiment, the value of N, and $X+Y+Z=N$ can be dynamically altered to allow various sets of electronic information to be dynamically selected and presented by a learner. In another embodiment, the electronic content is dynamically and randomly presented using the values of N, and/or X, Y, and Z to seed a random number generator.

For example, a learner with Christian beliefs, after selecting $N=9$ and $1+5+3=9$ (as described above) may dynamically select the number twelve (12) and $3+3+6=12$ to be randomly and dynamically presented with different Bible verses to learn about Jesus talking to his 12 Apostles about various topics related to the numbers three and six, etc.

Method 22 can be practiced with network devices 12, 14, 16, 18 or stand alone devices 19, etc. either with or without use of the communications network 20.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for learning retention through repetition, comprising:

receiving a selection input for a value for a non-zero number N for repeating a set of electronic information with N items stored in a computer readable medium on a network device with one or more processors connected to a communications network, wherein the value of the number N has a pre-determined personal significance to a learner;

receiving selection inputs on the network device for three additional numbers, X, Y and Z such that X+Y+Z=N and X+Y+Z=N represents a pre-determined pattern for presenting the set of electronic information with the pre-determined personal significance;

receiving a selection input on the network device for a type of belief system;

creating an optimal learning pattern for the received numbers and the pre-determined pattern in the received type of belief system for the learner in the computer readable medium on the network device, wherein the optimal learning pattern is created using the received numbers in the received type of belief system and allows the electronic information to be optimally stored and recalled from both a short term memory (STM) and a long term memory (LTM) of the learner when presented to the learner from the network device;

presenting using the set of electronic information with N items (X) times as an audio output, a video output or electronic text output on the network device as a first portion of the created optimal learning pattern;

presenting the set of electronic information with N items (Y+X) times as the audio, video or electronic text output on the network device as a second portion of the created optimal learning pattern, wherein presenting the set of electronic information (Y+X) times includes a creating first repetitive pattern that helps save the set of electronic information with N items in the STM in the human brain of the learner and develops a first portion of a brain schema for transferring the set of electronic information to the LTM of the human brain of the learner when presented to the learner from the network device; and presenting the set of electronic information with N items (Z+Y+X) times as the audio, video or electronic text output on the network device as a third portion of the created optimal learning pattern, wherein the N-pieces of information presented (Z+Y+X) times completes presentation of the created optimal learning pattern for the N-pieces of electronic information and develops a second portion of the brain schema for transferring the set of electronic information stored in STM to LTM of the human brain of the learner thereby aiding learning, retention and recall of the set of electronic information by the learner when presented to the learner from the network device.

2. The method of claim 1 further comprising a computer readable medium having stored therein instructions for causing one or more processors to execute the steps of the method.

3. The method of claim 1 wherein the value of the number N and X+Y+Z=N includes a religious significance for the learner.

4. The method of claim 1 wherein the value of number N and X+Y+Z=N includes a psychological significance for the learner.

5. The method of claim 4 wherein the value of the number N is selected to increase short term and long term retention of electronic information in the brain of the learner.

6. The method of claim 1 wherein the value of the number N and the three additional numbers, X, Y and Z such that X+Y+Z=N are selected for a Christian belief system to repetitively learn verses from the Bible.

7. The method of claim 1 wherein the electronic information includes audio information, video information or electronic textual information obtained from a database associated with the network device.

8. The method of claim 1 wherein the electronic information is presented on a stand alone non-networked device disconnected from the communications network.

9. The method of claim 1 wherein the electronic information is presented on the network device in communications with a wireless 802.11a, 802.11b, 802.11g, 802.11n, Wireless Fidelity (Wi-Fi), or Worldwide Interoperability for Microwave Access (WiMAX) communication network.

10. The method of claim 1 wherein values of N, and X+Y+Z=N are dynamically altered on the network device to allow others sets of electronic information to be dynamically selected and presented the learner.

11. The method of claim 1 values of N, and X+Y+Z=N are dynamically altered on the network device and used as seed numbers to a random number generator to allow others sets of electronic information to be dynamically and randomly selected and presented the learner.

12. A learning retention through repetition system, comprising in combination:

means for receiving a selection input for a value for a non-zero number N for repeating a set of electronic information with N items stored in a computer readable medium on a network device with one or more processors connected to a communications network, wherein the value of the number N has a pre-determined personal significance to a learner and for receiving selection inputs for three additional numbers, X, Y and Z such that X+Y+Z=N and X+Y+Z=N represents a pre-determined pattern for presenting the set of electronic information with the pre-determined personal significance and for receiving a selection input on the network device for a type of belief system;

means for creating an optimal learning pattern for the received numbers and the pre-determined pattern in the received type of belief system for the learner in the computer readable medium on the network device, wherein the optimal learning pattern is created using the received numbers in the received type of belief system and allows the electronic information to be optimally stored and recalled from both a short term memory (STM) and a long term memory (LTM) of the learner when presented to the learner; and means for presenting as an audio output, video output or electronic text output on the network device the set of electronic information with N items (X) times as a first portion of the created optimal learning pattern, for presenting the set of electronic information with N items (Y+X) times as a first portion of the created optimal learning pattern wherein presenting the set of electronic information (Y+X) times includes a first repetitive pattern that helps save the set of electronic information with N items in a short term memory (STM) in a human brain of the learner and develops a first portion of a brain schema for transferring the set of electronic information to a long term memory (LTM) of the human brain of the learner when presented to the learner from the network device, and for presenting the set of electronic information (Z+Y+X) times as a third portion of the created optimal learning pattern, wherein the N-pieces of information presented (Z+Y+X) times completes presentation of the created optimal learning pattern for the N-pieces of electronic information and develops a second portion of the brain schema for transferring the set of electronic information stored in STM to LTM of the human brain of the learner thereby aiding learning, retention and recall of the set of electronic information by the learner when presented to the learner from the network device.

13. The system of claim 12 wherein the electronic information includes audio information, video information or electronic textual information obtained from a database associated with the network device via a wireless communications network.

14. The system of claim 12 wherein the electronic information is presented on a stand alone non-networked device disconnected from the communications network.

15. The system of claim 12 wherein the electronic information is presented on a network device in communications with a wireless 802.11a, 802.11b, 802.11g, 802.11n, Wireless Fidelity (Wi-Fi), or Worldwide Interoperability for Microwave Access (WiMAX) communication network.

16. The system of claim 12 wherein the value of the number N and the three additional numbers, X, Y and Z such that X+Y+Z=N are selected for a Christian belief system to repetitively learn verses from the Bible.

17. The system of claim 12 further comprising a means for presenting includes dynamically presenting electronic information obtained from a database via the communications network.

18. The system of claim 12 further comprising a means for presenting includes presenting electronic information obtained from non-volatile stored on the network device or the stand along non-networked device disconnected from the communications network.

19. The system of claim 12 further comprising a means for selecting dynamically and randomly selecting different sets of electronic information for a database via a communications network.

20. The system of claim 12 wherein the optimal learning pattern is determined by changes in the human brain with scientific experiments on the human brain including Magnetic Resonance Imaging (MRI).

* * * * *